United States Patent [19]
Hoppmann et al.

[11] 3,912,120
[45] Oct. 14, 1975

[54] CENTRIFUGAL METHOD OF SORTING AND ORIENTING PARTICULATE ARTICLES

[75] Inventors: Kurt H. Hoppmann, Falls Church, Va.; George W. Edmunds, Derwood, Md.; Horst A. Schober, Falls Church, Va.

[73] Assignee: Hoppmann Corporation, Springfield, Va.

[22] Filed: Aug. 26, 1974

[21] Appl. No.: 500,835

Related U.S. Application Data

[63] Continuation-in-part of Ser. No. 344,696, March 26, 1973, Pat. No. 3,831,734.

[52] U.S. Cl. ..................... 221/7; 221/156; 209/83; 198/287
[51] Int. Cl.² ........................................... B07C 9/00
[58] Field of Search ........... 221/163, 167, 169, 170, 221/7, 156; 209/60, 199, 73, 74, 83, 86, 87; 198/287

[56] References Cited
UNITED STATES PATENTS

| | | | |
|---|---|---|---|
| 3,063,596 | 11/1962 | D'Autheville et al.................... | 221/7 |
| 3,295,659 | 1/1967 | Aidlin ............................. | 221/169 X |
| 3,669,260 | 6/1972 | Hoppmann et al............. | 221/169 X |
| 3,831,734 | 8/1974 | Hoppmann et al............. | 198/287 X |

*Primary Examiner*—Robert B. Reeves
*Assistant Examiner*—Joseph J. Rolla
*Attorney, Agent, or Firm*—David H. Semmes

[57] ABSTRACT

High speed feeding, counting, orienting and storing of parts, for example ammunition, candy, machine screws, nuts, pharmaceutical and cosmetic containers and the like. The articles are randomly discharged upon a rotating radially aligned channel, a vertical restraint is imposed upon the articles within the channel, so as to align the articles with respect to the channel. The articles are dropped while rotating, such that the desired orientation is achieved within and prior to discharge from the channel. The method is distinguished from the prior art in that the orientation occurs as the parts are distributed circumferentially and radially, that is the parts are arranged in a plurality of moving single file lines. The prior art techniques involve the single depositing of an article at the periphery of a rotating rim, there being no suggestion of separating or orienting a plurality of articles within each of a plurality of radially extending channels.

21 Claims, 20 Drawing Figures

TO COUNTING MEANS

CENTRIFUGAL METHOD OF SORTING AND ORIENTING PARTICULATE ARTICLES

CROSS-REFERENCES TO RELATED APPLICATIONS

A continuation-in-part of applicant's earlier filed application entitled CENTRIFUGAL METHOD OF SORTING PARTICULATE ARTICLES (Ser. No. 344,696), filed Mar. 26, 1973, now U.S. Pat. No. 3,831,734. The present application is distinguished by its refinement of the step of radial separating and orienting in a series of radially extending channels.

BACKGROUND OF THE INVENTION

1. Field of the Invention

Increasing attention is being given to methods for high speed orientation of nails, pills, machines screws, nuts, small arms munitions and the like. Recent inventors have evolved a plurality of rotating devices which centrifugally discharge articles to be counted from the edges of a rotating plane. Traditionally these centrifugally distributed articles are collected in a single circumferential recess from which they may be counted or individually discharged. There is no suggestion of radially aligning a plurality of articles in single file relationship adjacent each circumferential discharge channel or aperture. In conventional devices the individual orienting and counting in a single separating recess is time consuming, subject to jamming and breakdown and economically disadvantageous.

2. Description of the Prior Art

| | |
|---|---|
| HOAR | 2,632,588 |
| GARRETT | 2,763,108 |
| d'AUTHEVILLE | 3,063,596 |
| PEARSON | 3,170,627 |
| HURST | 3,215,310 |
| READ | 3,253,604 |
| PEARSON | 3,266,664 |
| HURST | 3,368,713 |
| HOPPMANN, et al | 3,669,260 |
| HOPPMANN, et al | 3,722,764 |

SUMMARY OF THE INVENTION

According to the present invention, the articles to be separated and oriented are discharged upon a rotating outer rim having a plurality of radially aligned channels. As the articles enter the channels, a vertical restraint is imposed so as to align the articles with respect to each channel and the articles while rotating are dropped so as to achieve the desired orientation. Modifications of invention include orienting the articles by means of gravity, orienting by means of the configuration of the device and selective discharge of the articles from orienting channels.

Figures 4, 5:
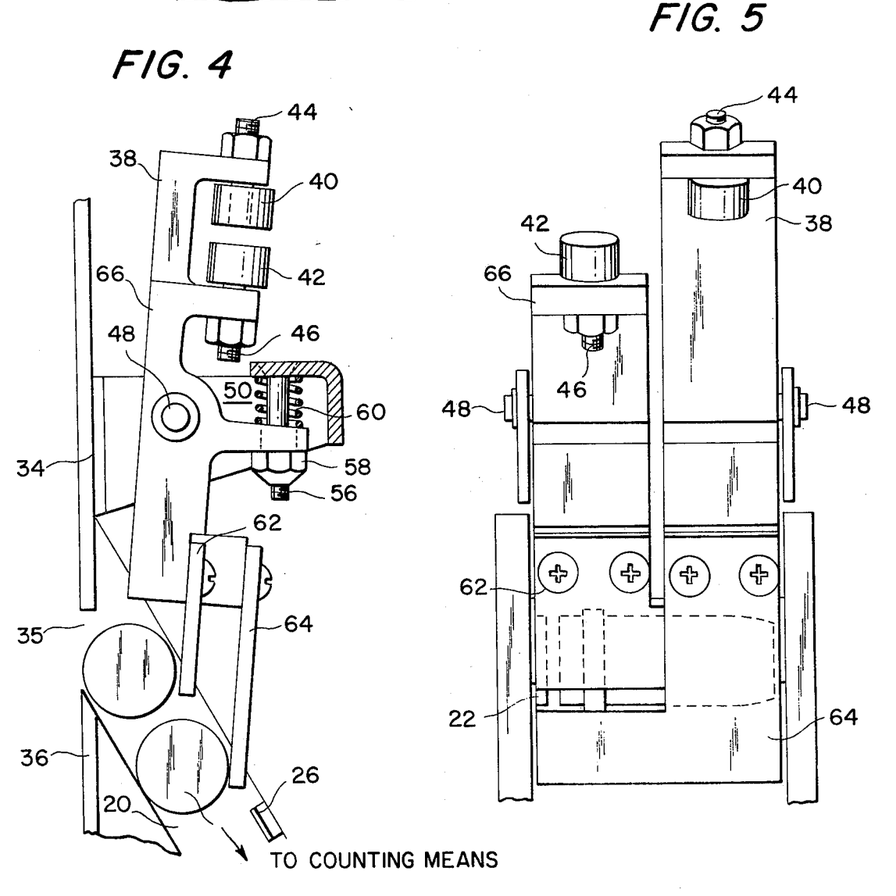
FIG. 4 is an enlarged side elevation of a cam action discharge device of a type which may be used in counting of parts as they are discharged from the channels.
FIG. 5 is a front elevation of the cam action discharge device.

In FIGS. 4 and 5 there is illustrated the cam actuated releases 62, 64 which may be positioned so as to intersect the radial channel above orienting tabs 24 and 26. An outer rotating baffle 34–36 may have aperture 35 leading to channel 20. Housing 50 may be secured to upper portion of the baffle 34 such that the pivoting members 66 and 38 may be supported upon transverse pivoting rod 48. Pivoting member 66 includes cam follower element 42 supported therein by means of threaded pin 46 or the like and lower release 62 secured thereon by means of Allenhead screws or the like. FIG. 4 further schematically illustrates a subsequent counting means.

Figure 19:
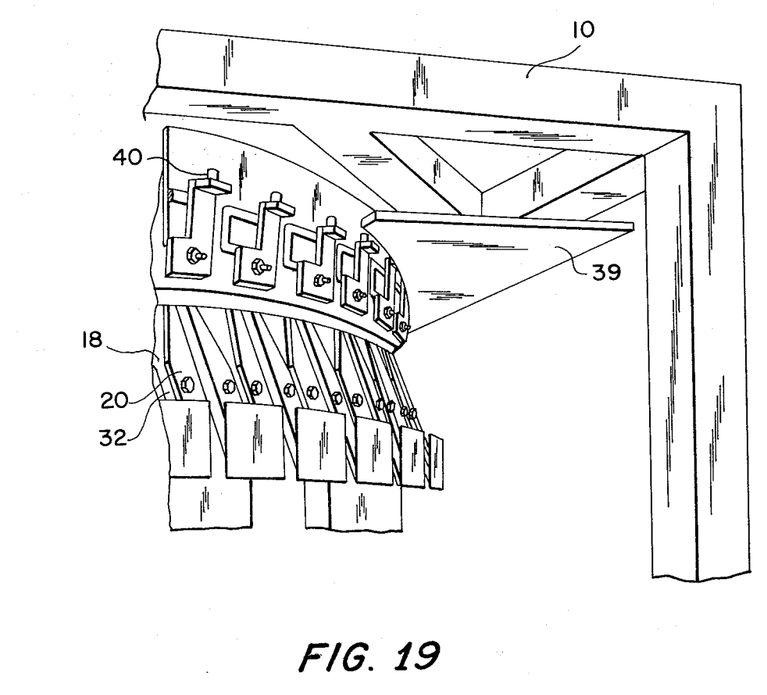
FIG. 19 is a fragmentary perspective showing engagement of the individual cam followers or rollers with the stationary cam.

A corresponding cam pivoted element 38 includes cam follower element 40 supported by threaded pin 44 or the like and including lower tab 64. Both elements may be spring tensioned by means of threaded pin 56, nut 58 and compression spring 60 or the like. They may be adjusted so as to be individually or simultaneously actuated by the striking of an exterior cam against cam follower 40 or 42, as illustrated in FIG. 19.

Figure 1:
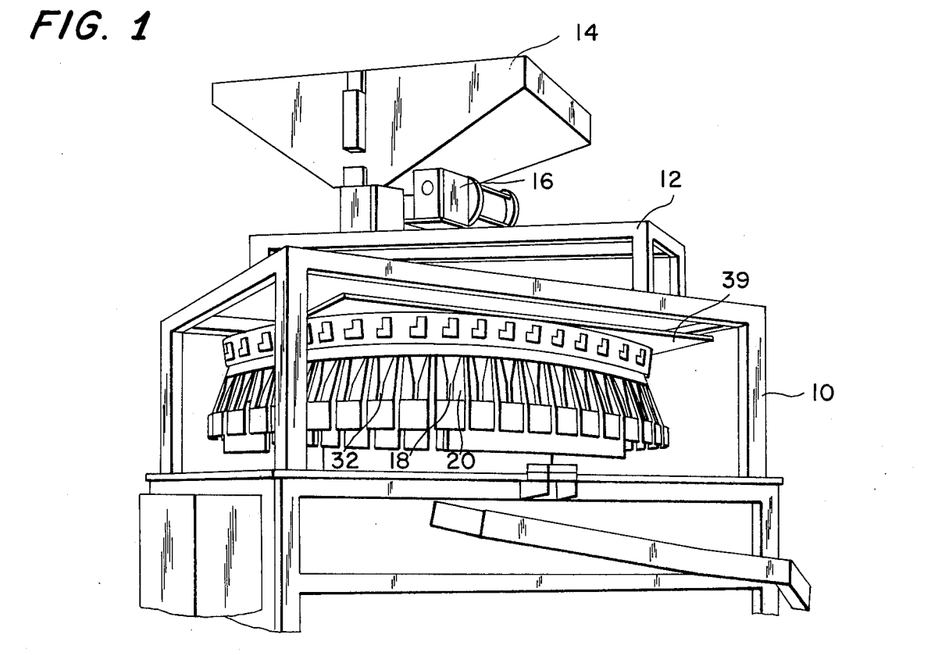
FIG. 1 is a perspective view of a proposed apparatus, constructed according to the present method and showing an outer rotating rim having a vast plurality of radially extending downwardly inclined channels, each channel having an actuated release latch.
Figure 2:
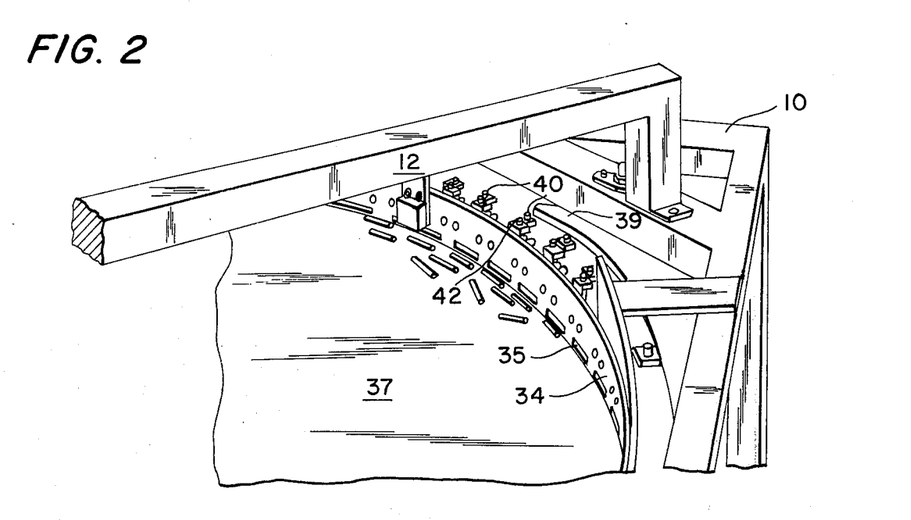
FIG. 2 is a fragmentary perspective of the suggested apparatus shown in FIG. 1.

In FIGS. 1 and 2 there is illustrated a rotating bowl concept wherein the inner rotating bowl has an inclined surface 37 converging at aperture 35, a plurality of shell casing being shown as advanced to aperture 35 by means of centrifugal force. The array might include a frame 10 supporting the rotating bowl element as well as an upper frame 12 supporting feeding hopper 14 and drive element 16. The individual channels 20 may include clear plastic covers 18. In FIG. 19 there is further illustrated the stationary cam 39 engaging rollers 40.

Figure 6:
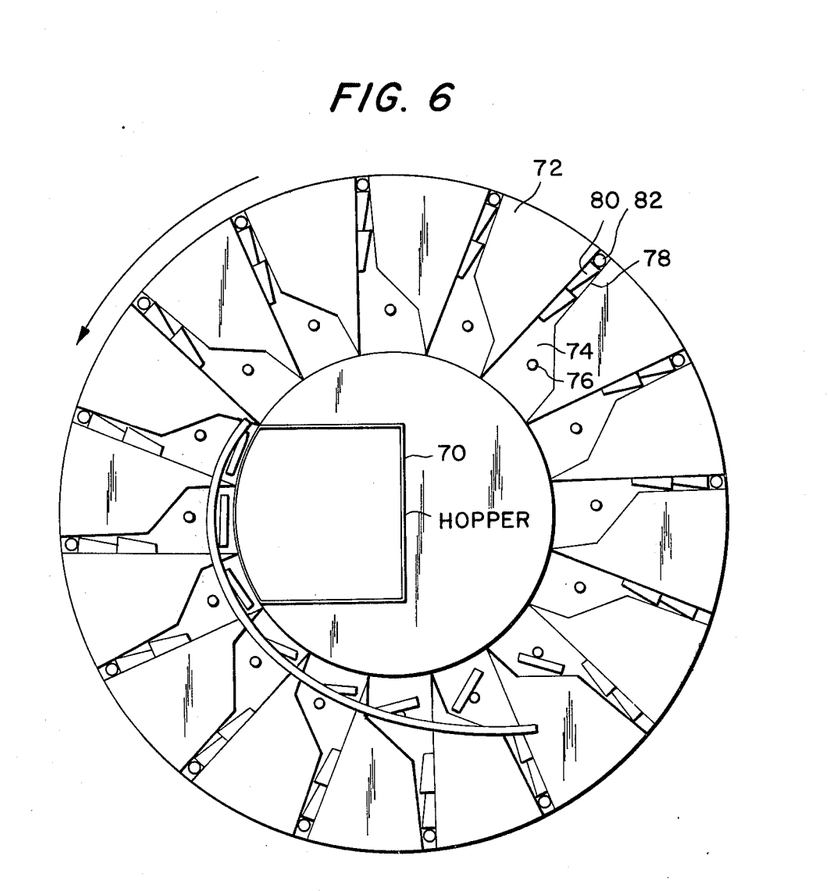
FIG. 6 is a top plan of a modification of invention wherein a hopper is used to feed an orienting rim assembly of the type shown in the parent application.
Figure 7:
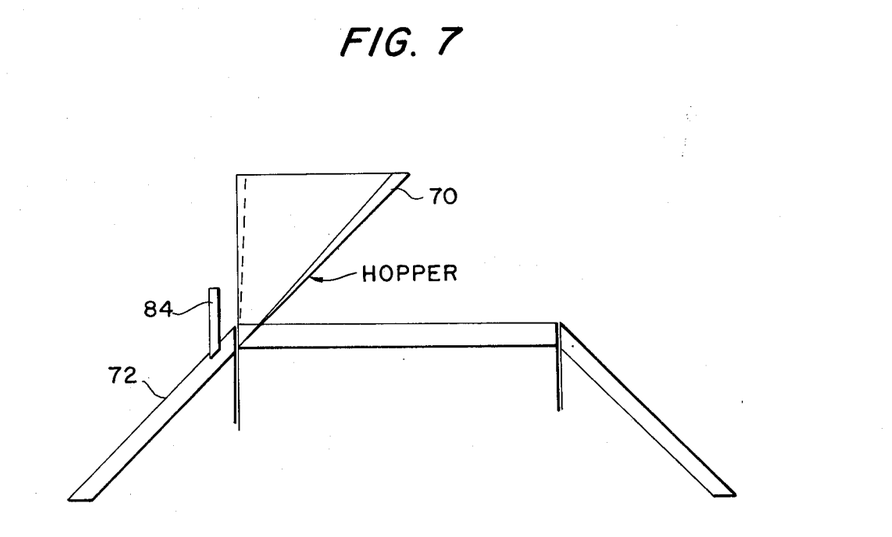
FIG. 7 is a side elevation showing the use of a hopper to feed an inclined outer rim of the type illustrated in FIG. 1.

Modifications of the invention are illustrated in FIG. 6 and 7 wherein a hopper is used to discharge shells or the like upon an outwardly inclined separator 72 having a plurality of radial channels 74 each with a orienting pall 76 so as to align the shell elements 80 heavy end first prior to their dropping vertically into a position of radial discharge 78. A cam actuated release 84 may be employed.

Figure 8:
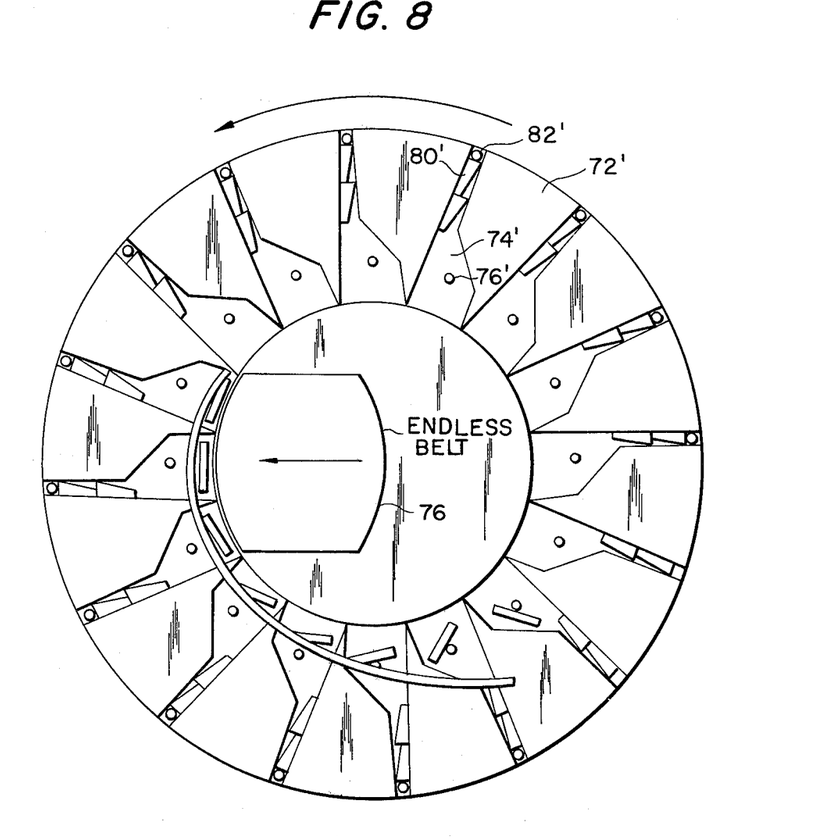
FIG. 8 is a top plan illustrating the use of an endless belt to feed an outer rim of the type illustrated in the parent application.
Figure 9:
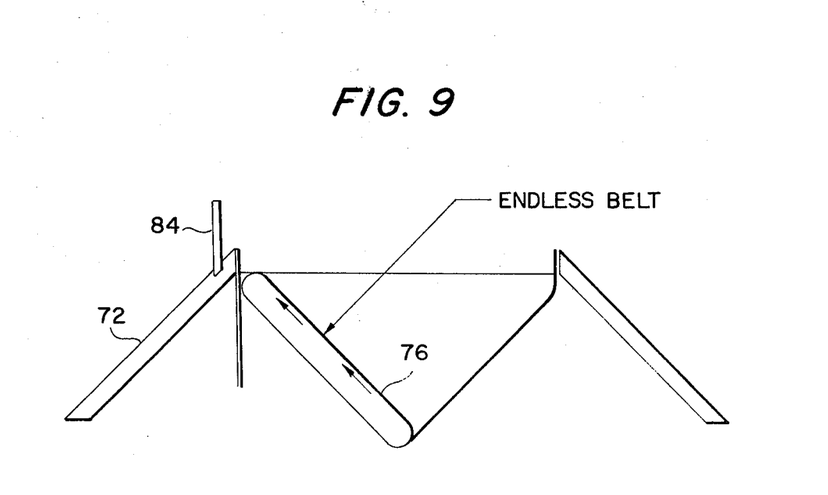
FIG. 9 is a side elevation of the endless belt modification illustrated in FIG. 8.

In FIGS. 8 and 9 a similar orienting ram is shown as being fed by endless belt mechanism 76.

DESCRIPTION OF THE PREFERRED EMBODIMENTS

Figure 3:
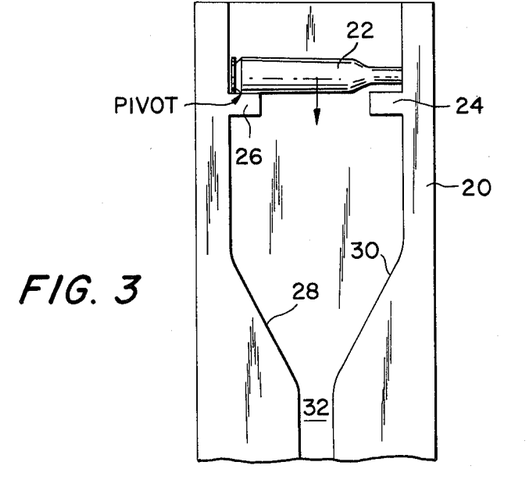
FIG. 3 is a fragmentary side elevation of a chute or channel orienting part of the type shown in FIG. 1.
Figure 3A:
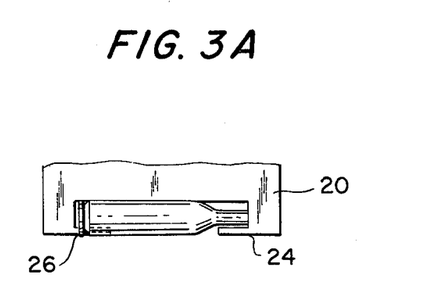
FIG. 3A is a fragmentary top plan of the orienting part, showing a small arms shell casing being oriented by a small tab and passing under the tab while its bottom or wide end is restrained.
Figure 18:
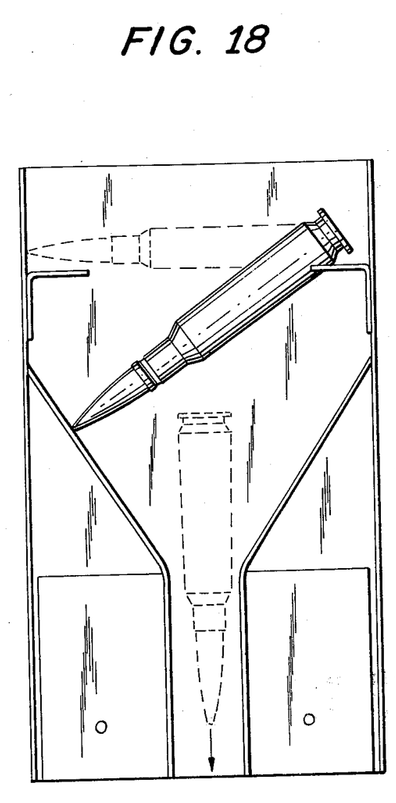
FIG. 18 is an enlarged elevation of the orienting chute employed in the construction shown in FIGS. 1 and 2.

In FIG. 3 there is illustrated in fragmentary detail a radial chute generally designated as 20, having superposed laterally inwardly extending orienting tabs 24 and 26 inclined shoulders 28 and 30, which converge into radial aligning chute 32. As illustrated in FIGS. 3A and 18 the large or bottom end of the shell 22 is retained by tab 26, while the smaller or front end of the shell passes freely under tab 24, such that the shell is distributed small end first.

Figure 10:
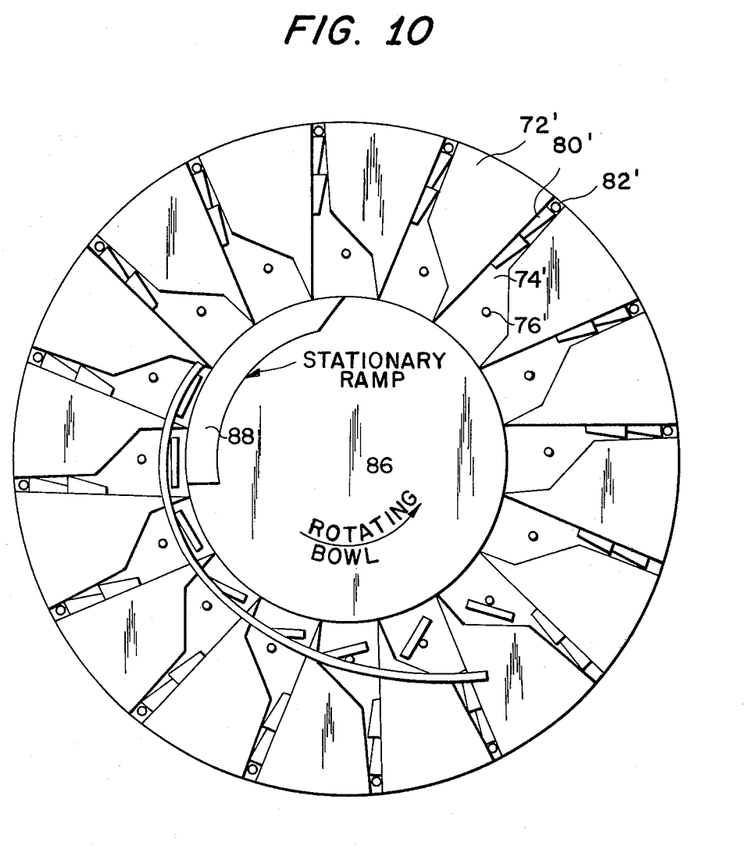
FIG. 10 is a top plan of the use of a rotating inner rim, and stationary ramp feeding onto an inclined outer rim.
Figure 11:
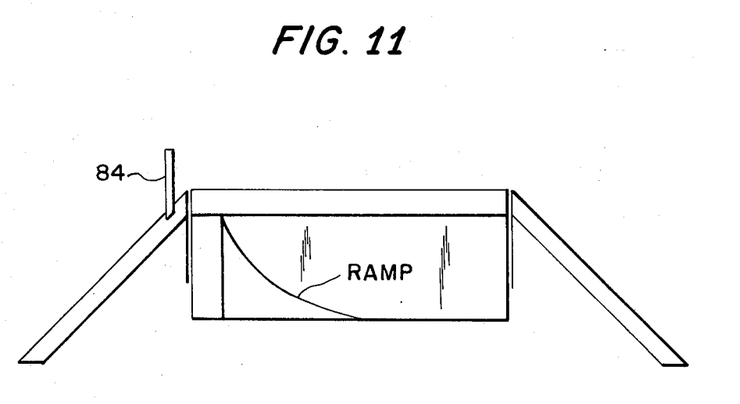
FIG. 11 is a side elevation thereof.

In FIGS. 10 and 11 a similar orienting rim 72 is shown as being fed by rotating bowl 86 and stationary ramp assembly 88. Rim 72 includes radial channels 76 each having a pivoting pawl 76 or the like for delivering shells 80 end first prior to their dropping and vertical storage as at 82 in the rim periphery.

Figure 12:
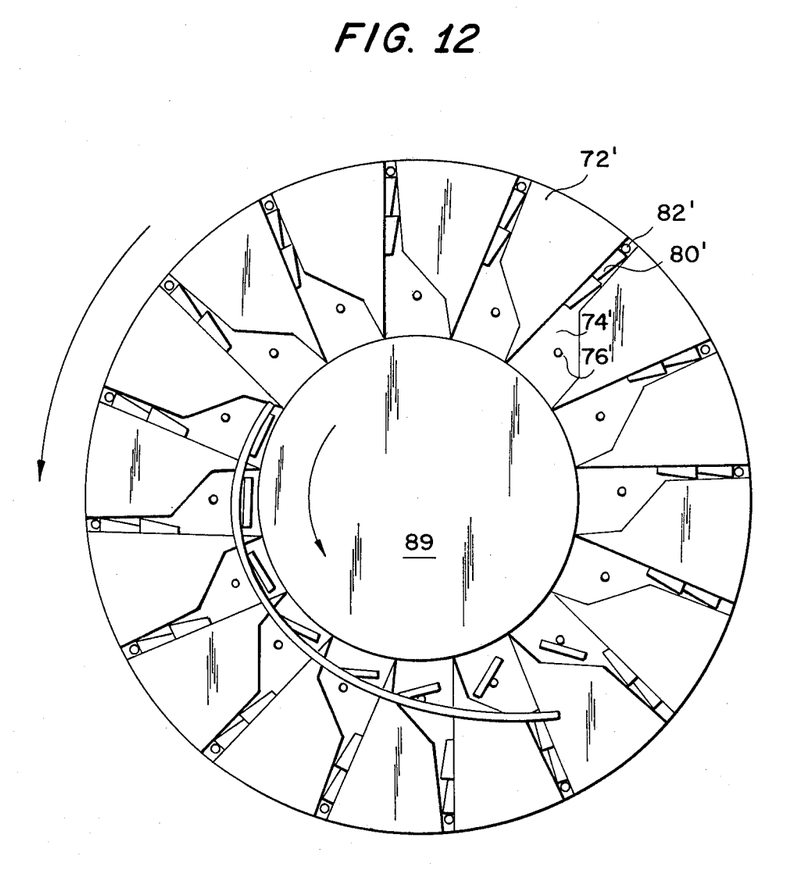
FIG. 12 is a showing of a tilted bowl inner rim feeding of the rim with radial channels.
Figure 13:
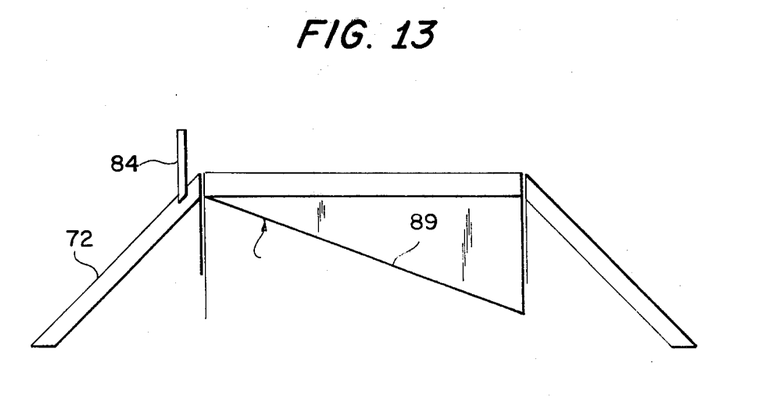
FIG. 13 is a side elevation thereof.

In FIGS. 12 and 13 a similar exterior feeding rim is shown fed by a rotating inner rim, having a tilted surface 89 so as to contact and feed into the radial channels 74 each with an intersecting cam actuated release, generally designated as 84.

Figure 14:
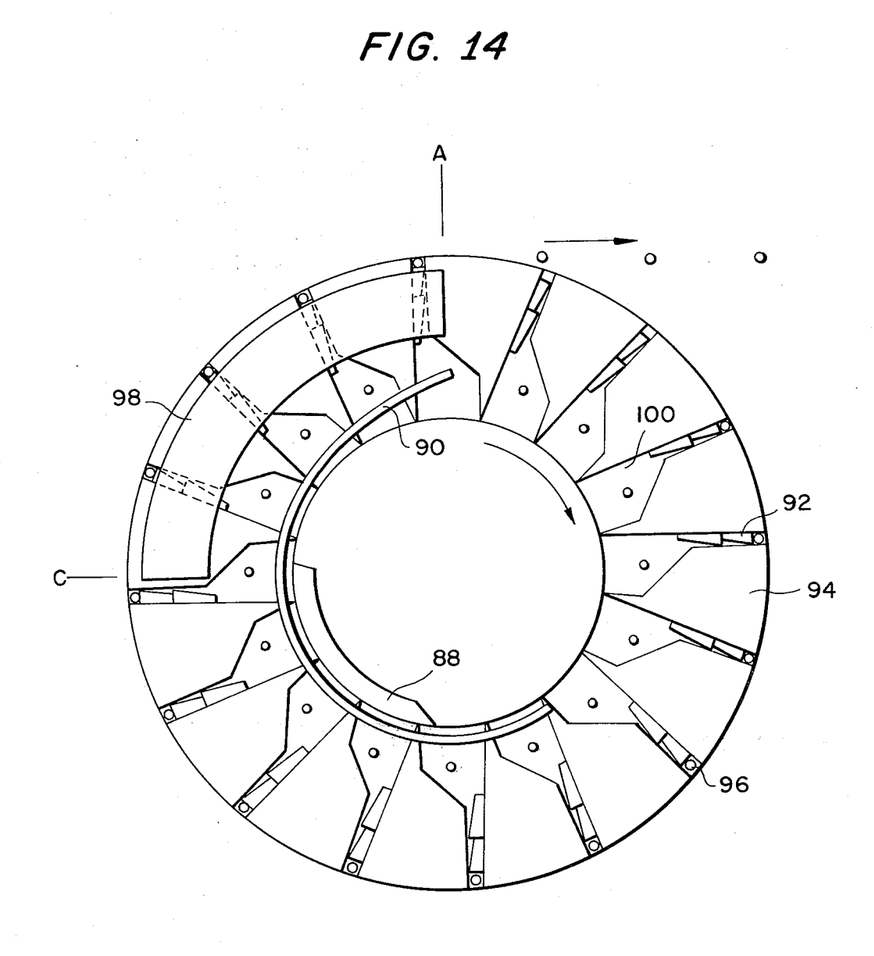
FIG. 14 is a top plan showing the use of the rotating inner rim and stationary ramp feeding onto an outer rim having a plurality of radially extending chutes as in the parent application.

In FIG. 14 there is illustrated a further modification of the FIG. 10 device, wherein a plate 98 is imposed as a further vertical restraint used in aligning shells 92 and 96 within channels 100.

Figure 15:
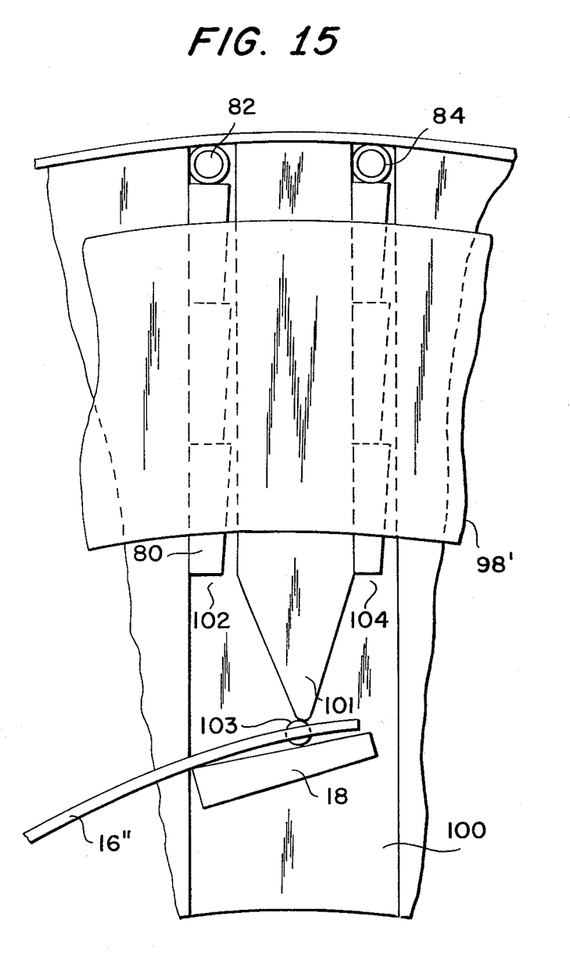
FIG. 15 is a modification thereof, wherein the radial chutes involve a pall and a dual channel aligning device.

In FIG. 15 there is fragmentarily illustrated a further modification wherein the channel 100 includes a truncated forepart 101 used in connection with pall 103, separating the shells into twin channels 102 and 104.

Figure 16:
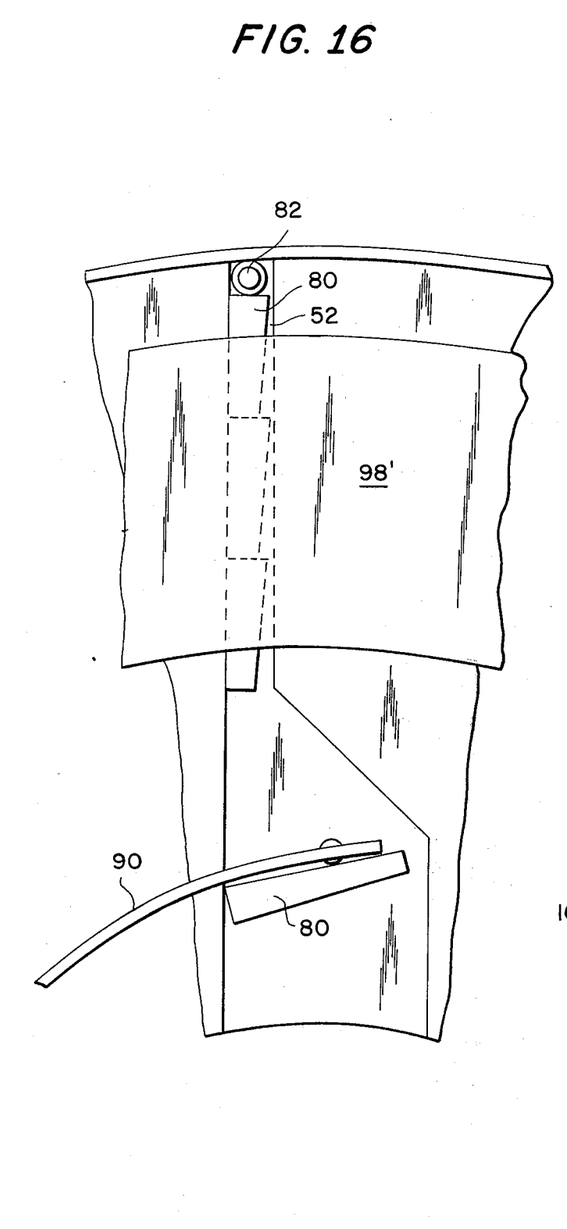
FIG. 16 is another modification showing the pall used to orient the articles heavy end first outward.
Figure 17:
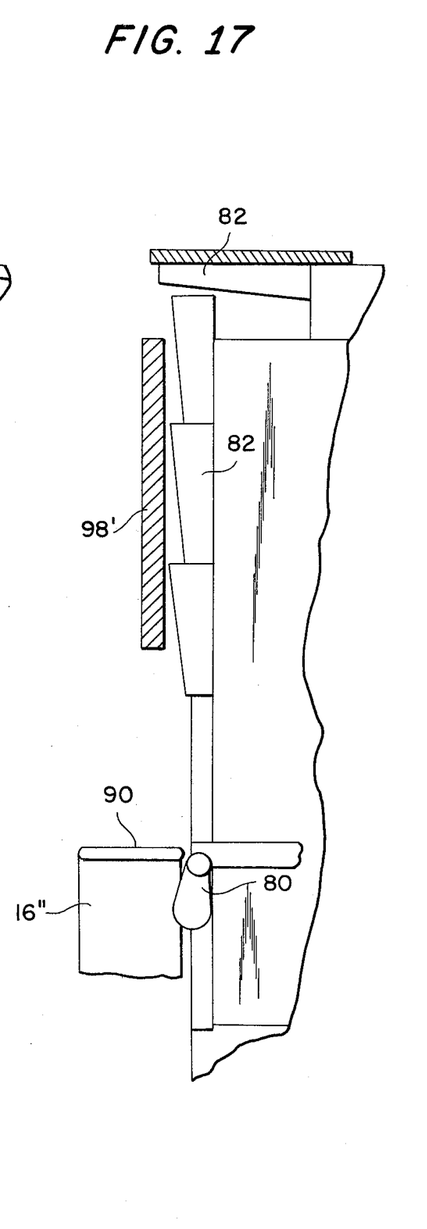
FIG. 17 is a fragmentary side elevation of the modification shown in FIG. 16.

FIG. 16 is an enlarged showing of the arrangement shown in FIG. 14 and FIG. 17 is a fragmentary side elevation of the device shown in FIG. 16.

The present invention applies the rotating turret concept to the process of feeding and orienting. Parts are captured in radially arranged tracks on a rotating rim. As the rim rotates, the parts travel in both a circumferential direction and in a radial direction. Orientation occurs during and because of the radial motion. This invention is unique in this respect. All prior art covering rotary feeder-orienters refers to machines in which the orientation process is performed sequentially, in-line. That is, the parts are arranged in a moving single file, which may be straight or curved. Orientation occurs on a single file basis so that the parts are oriented sequentially. A part cannot be oriented until the one in front of it has either been oriented or ejected from the stream.

In the present invention, the parts are individually placed into radial tracks or chutes. Such orientation occurs during the radial travel, the parts are oriented essentially in parallel and, in fact, any one part may complete its orientation before, at the same time, or after the part preceding it. This essentially parallel orientation permits the parts to be processed at extraordinarily high rates of speed.

The radial travel of the parts in the chutes also adds another dimension to the orientation process. Prior art shows no feeder-orienter systems providing for radial travel within confined chutes or tracks. The radial motion is important since the parts travel and thus orient at their natural speed, depending upon gravitational and centrifugal forces. Unlike other in-line orienting processes, the speed or orientation is relatively insensitive to the rate at which the parts are being processed.

Because the parts are singulated by placing them individually into radial chutes, they are delivered at predetermined intervals on the periphery of the track assembly. This predetermined spacing is extremely important where the oriented part must subsequently interface with another machine element. This is another unique feature of our invention.

Manifestly, numerous variations in structure may be employed without departing from the spirit of the claims.

We claim:

1. Centrifugal method of sorting and orienting particulate articles comprising:
    A. randomly discharging said articles into a plurality of radially aligned downwardly inclined channels defined within a rotating outer rim;
    B. imposing a vertical restraint so as to align said articles with respect to said channels; and,
    C. dropping while rotating said articles into the desired orientation within each said channel.

2. Centrifugal method of sorting and orienting particulate articles as in claim 1, including selectively discharging said articles from each channel.

3. Centrifugal method of sorting and orienting particulate articles as in claim 2 including counting of said parts, as they are discharged from said channels.

4. Centrifugal method of sorting and orienting particulate articles as in claim 3, including counting of said parts in batches while storing, so as to provide a high speed, low revolution per minute counting system.

5. Centrifugal method of sorting and orienting particulate articles as in claim 1, including accelerating and discharging said articles from a rotating inner rim into said radially aligned channels.

6. Centrifugal method of sorting and orienting particulate articles as in claim 1, including gauging said articles by vertical restraint.

7. Centrifugal method of sorting and orienting particulate articles as in claim 1, wherein said vertical restraint is stationary.

8. Centrifugal method of sorting and orienting particulate articles as in claim 1, wherein said vertical restraint is rotating with the outer rim.

9. Centrifugal method of sorting and orienting particulate articles as in claim 1, wherein said articles are discharged tangentially from said channels.

10. Centrifugal method of sorting and orienting particulate articles as in claim 1, wherein said articles are discharged vertically downwardly from said channels.

11. Centrifugal method of sorting and orienting particulate articles as in claim 1, including singulating and separating said articles within said channels.

12. Centrifugal method of sorting and orienting particulate articles as in claim 11, wherein said separating of parts includes counting thereof.

13. Centrifugal method of sorting and orienting particulate articles as in claim 1, including precisely separating said particles into single file relationship within said channels.

14. Centrifugal method of sorting and orienting particulate articles as in claim 1, including vertically protruding said channels as an assistance in orienting said parts.

15. Centrifugal method of sorting and orienting particulate articles as in claim 14, including storing said parts within a channel reservoir storage space.

16. Centrifugal method of sorting and orienting particulate articles as in claim 14, including storing said parts after orienting in such use.

17. Centrifugal method of sorting and orienting particulate articles as in claim 14, including storing said parts prior to orienting within channels.

18. Centrifugal method of sorting and orienting particulate articles as in claim 1, including dropping said articles downwardly in said channels so as to pivot said articles vertically downwardly.

19. Centrifugal method of sorting and orienting particulate articles as in claim 1, including pivoting the heavier end of said articles radially outwardly in said channels.

20. Centrifugal method of sorting and orienting particulate articles as in claim 1 including pivoting the smaller end of said articles radially outwardly within said channels.

21. Centrifugal method of sorting and orienting particulate articles as in claim 1, including abruptly terminating downward movement at the end of said radially extending channel.

* * * * *